April 25, 1933.　　　　J. EKELÖF　　　　1,906,141

ROTARY PUMP, COMPRESSOR, AND THE LIKE

Filed Dec. 5, 1931　　　3 Sheets-Sheet 1

Inventor
J. Ekelöf,
by C. F. Neuroth
Atty

April 25, 1933.　　　　　J. EKELÖF　　　　　1,906,141
ROTARY PUMP, COMPRESSOR, AND THE LIKE
Filed Dec. 5, 1931　　　3 Sheets-Sheet 2

Inventor
J. Ekelöf

April 25, 1933.    J. EKELÖF    1,906,141
ROTARY PUMP, COMPRESSOR, AND THE LIKE
Filed Dec. 5, 1931    3 Sheets-Sheet 3

Inventor:
J. Ekelöf,

Patented Apr. 25, 1933

1,906,141

UNITED STATES PATENT OFFICE

JOHN EKELÖF, OF LIDINGÖ, SWEDEN

ROTARY PUMP, COMPRESSOR, AND THE LIKE

Application filed December 5, 1931, Serial No. 579,244, and in Sweden October 12, 1929.

This invention refers to improvements in rotary pumps, compressors and similar rotary machines of the type which comprises an annular and eccentrically movable piston member adapted to act within an annular cylinder, one end wall of which being fixedly mounted, and the other consisting of a cover disc connected with the annular piston member. The said cover disc is slidably mounted in contact with the end faces of the annular cylinder, and is kept tightened against said faces, while the piston is kept in tightening contact with the two coaxial walls of the annular cylinder and with the fixed end wall, so that a plurality of crescent-shaped working chambers are formed within the cylinder due to the eccentric position of the piston member therein.

Further, the cylinder is interiorly provided with a radial transverse wall, the inlet and outlet means of the machine being positioned at opposite sides of this wall, and the piston is split at the point of location of said wall and positioned so as to straddle the same.

In pumps or compressors of this kind it has been found that the piston adjacent to the radial transverse wall, is subjected to such a heavy wear that the function of the machine will suffer therefrom, and the present invention has for its main object to eliminate this disadvantage. To this end, generally speaking, the invention is characterized by means adapted to effect a guiding of the piston in relation to the radial transverse wall within the cylinder, and this guiding effect is preferably established by the intermediary of the cover disc. In constructional respect a guiding means of this kind may naturally be carried out in a plurality of varying ways, as will be understood from the following.

A plurality of embodiments of the invention are to be described in the following by reference to the accompanying drawings in which:—

Fig. 5 shows another embodiment in the same manner as Fig. 3, and

Fig. 6 shows another embodiment in the same manner as Fig. 4.

Fig. 8 is a cross section of the same, while

Figure 1:
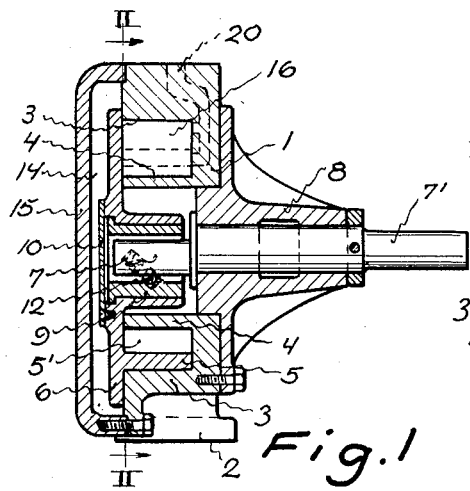
Fig. 1 shows an embodiment of the machine seen in longitudinal section.
Figure 2:
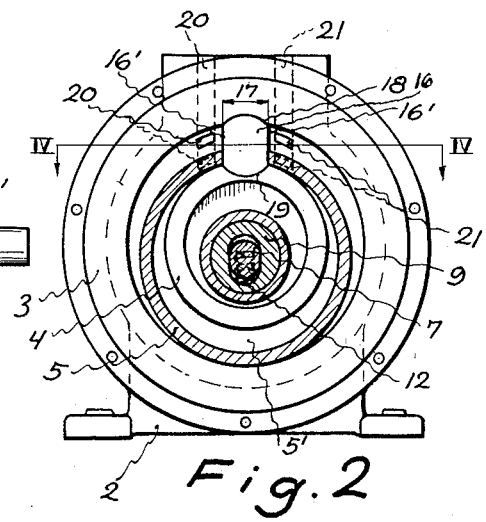
Fig. 2 is a cross section thereof at the line II—II in Fig. 1.

Referring at first to the embodiment of the machine shown in Figs. 1 and 2, the machine consists of a body 1 supported by the base member 2 and provided with two coaxial cylinder walls 3 and 4, which, together with a fixed end wall and a cover disc to be described in the following, form the annular cylinder chamber 5′ in which the annular piston member 5 is adapted to work. In its different positions the piston 5 stands always in contact at its outer side with the cylinder wall 3, and at its inner side with the wall 4, so that the crescent-shaped working chambers hinted at above are formed. The piston is connected with a cover disc 6, the inner side of which is positioned slidingly in a tightening contact with the end faces of the cylinder walls 3, 4, simultaneously as the inner edge of the piston member 5 in a similar manner is positioned in contact with the fixed cylinder wall.

The piston member 5 is set into motion by means of a crank pin 7 connected with the driving shaft 7' which is mounted in and axially guided by the cover member 8. The crank pin 7 is provided with two parallel side faces, and a boss 9 is mounted thereon in a manner so as to be displaceable both in axial and radial direction. The boss 9 is rotatably mounted and guided in axial direction relatively to the piston member 5 by means of a hub-shaped portion connected with the cover disc 6 and surrounding said boss. A cover 10 is provided exteriorly of the boss on the outer side of the cover disc 6.

An inclined spring 12 is provided between the pin 7 and the boss 9, such spring pressing the piston member 5 into contact with the cylinder walls 3, 4 in radial direction, and simultaneously it presses the cover disc axially into contact with the said walls. Further the axial contact of the cover disc and the piston is secured by means of a pressure fluid at hand at the outer side of the cover disc, such pressure acting within the chamber 14 which is confined by means of the cover 15.

According to the invention, the piston 5 is guided by means of the radial transverse wall 16 within the cylinder, such wall according to this modification being rotatably and tightly mounted in the cylinder walls 3, 4. According to Figs. 1 and 2 the transverse wall 16 consists of a cylindrical member having the same length as the width of the cylinder chamber 5', said wall being provided with two opposite and parallel side faces 16' having substantially the same width (dimension in radial direction) as the distance between the cylinder walls 3, 4. The piston member 5 is split at 17 (see Figs. 3 and 5), and the edges of the piston ends thus formed are positioned tightly in contact with the transverse wall which is tightly in contact with the fixed cylinder wall and the cover disc. The bearing for the wall 16 consists of arc-shaped recesses 18, 19 in the cylinder walls 3, 4 and when acted upon by the piston the transverse wall 16 will get an oscillatory rotating motion, the piston ends then sliding in contact with the flat side faces of the said wall which serves as a guiding means for the piston. At opposite sides of the transverse wall 16 the cylinder chamber 5' is provided with inlet and outlet means 20, 21 for the working fluid.

Figure 3:
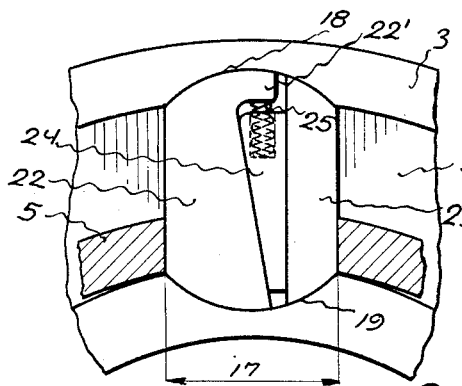
Fig. 3 is drawn to a larger scale and shows the radial transverse wall of the machine, and the adjacent parts thereof, seen in end view.

According to Fig. 3, the transverse wall is obliquely divided in two parts 22, 23, and between these parts is provided a wedge 24 acted upon by a spring 25 abutting against a lug 22' on one of the wall parts. This wedge will act upon the wall parts 22, 23 in such a manner that they will be pressed apart and towards the bearing faces 18, 19.

Figure 4:
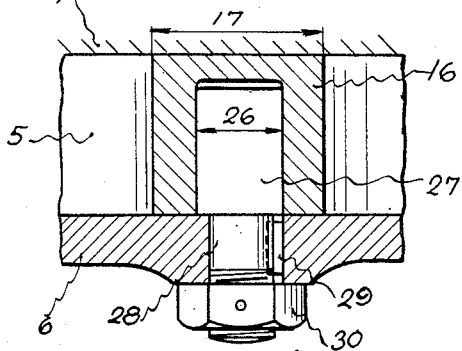

Fig. 4 shows an embodiment of the invention, according to which the wall 16 is provided with a guide slot 26 adapted to accommodate a guide pin 27 affixed to the cover disc 6 by means of a bolt 28, a key and a nut 30.

Figure 5:
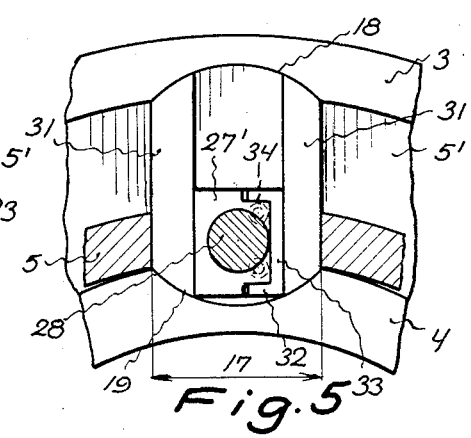
Figs. 4-6 are also drawn to a larger scale and show other embodiments of the radial transverse wall, in that Fig. 4 shows an embodiment thereof seen in section at the line IV—IV in Fig. 2.
Figure 6:
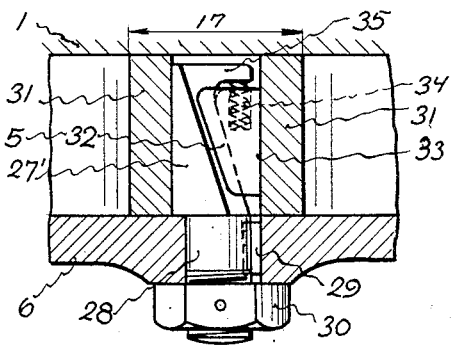
Figure 7:
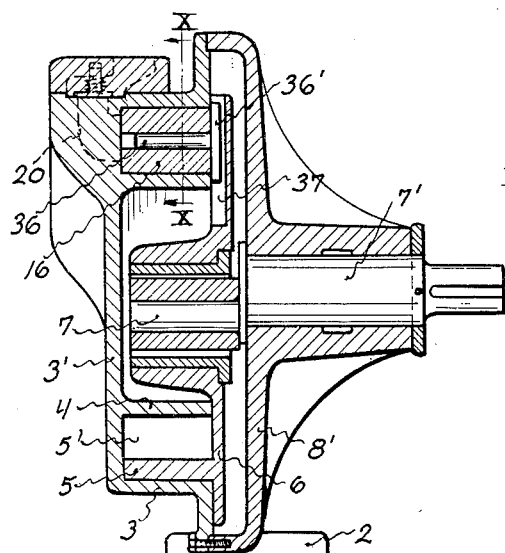
Fig. 7 shows a modified form of the machine seen in longitudinal section.

Figs. 5 and 6 show a modified embodiment of the transverse wall, according to which the said wall is subdivided into two equal parts 31, 31, the one side of the guide pin 27' being bevelled and adapted to coact with a wedge member 32 controlled by means of guides 33 and acted upon by springs 34 abutting against a lug 35 on the guide pin, so that the outer faces of the pin and the wedge will form guide faces pressed into contact with the inner guide faces of the wall members 31. Hereby the said wall members 31 are also pressed apart and against their bearing faces 18, 19, and the construction described will automatically compensate for the wear at all of the sliding faces.

In general aspect, the embodiment according to Figs. 7–10 is a reversal of the foregoing, in that the guide pin is mounted in or connected with the transverse wall 16 and provided with a head slidingly engaging a slot in the cover disc 6. In these figures the same reference letters as above are used on corresponding and similar parts of construction, but it is to be observed that, in this instance, it is the bearing member 8' for the driving shaft, which is affixed to the base member 2, while the cylinder body 3' of the machine is disconnectibly affixed to the said bearing member. Naturally, it is also possible to construct the machine in this way without any influence upon the function of the same, and in these parts a nearer description of this embodiment of the machine seems to be superfluous.

In comparison with the embodiment described above, the difference is that the transverse wall 16 is fixedly mounted between the cylinder walls 3, 4, and it is provided with a bearing bore for a pin 36 provided with a head 36' which preferably is of an aproximately rectangular shape. This head extends into a radial slot or grove 37 in the cover disc 6, and at the movements of the latter it will turn around the axis of the pin 36.

Figure 8:
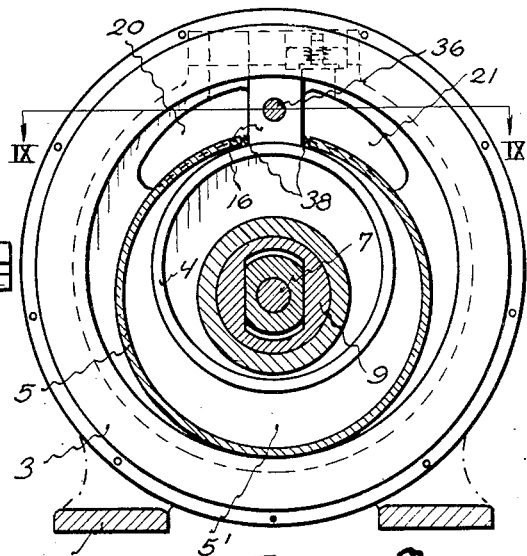
Figure 9:
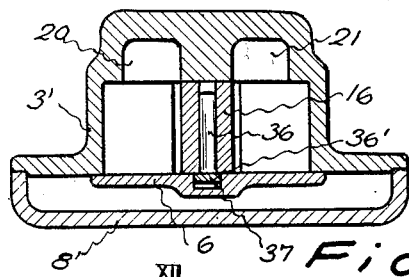
Fig. 9 is a section mainly at the line IX—IX in Fig. 8.
Figure 10:
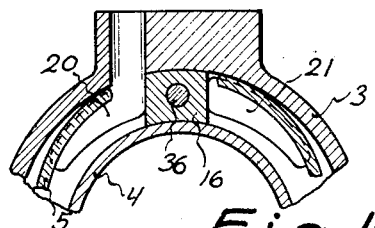
Fig. 10 shows the modified form of the guiding means seen in section at the line X—X in Fig. 7.

As will be understood from Fig. 8, the edges of the piston adjacent to the wall 16 are not in contact with said wall in this construction, but a relatively small space is at hand at 38, and a construction of this kind may also be employed in case the piston is guided by the intermediary of the cover disc.

In the embodiment of the machine according to Figures 11-14 it is supposed that the transverse wall 16 shall be rigidly mounted, and it is affixed by means of a screw 39 exposed to the exterior of the machine through the cover member 8. The transverse wall 16 (see especially Fig. 13) is provided with a threaded bore adapted to accommodate a screw 40 provided with a tapering throat 40', so that it may be hardly tightened and wedged into the bore. This screw is provided with a cylindrical portion 40" extending beyond the end of the transverse wall 16 and forming a bearing pin for a guide block 41 rotatably mounted thereon. At its extreme end the screw 40 is provided with a head, and a clearance 42 is at hand between this head and the block 41, so that the block will be freely and easily rotatable on the cylindrical portion 40" of the screw independently of the tightening of the same.

Figure 11:
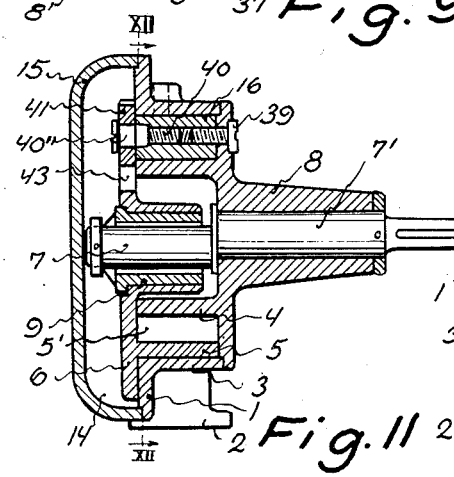
Fig. 11 shows still another modified form of the machine seen in longitudinal section.
Figure 12:
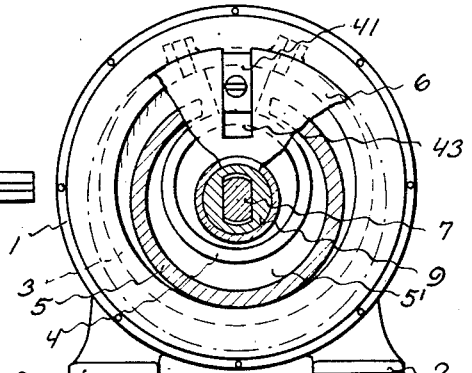
Fig. 12 is a cross section at the line XII—XII in Fig. 11.
Figure 13:
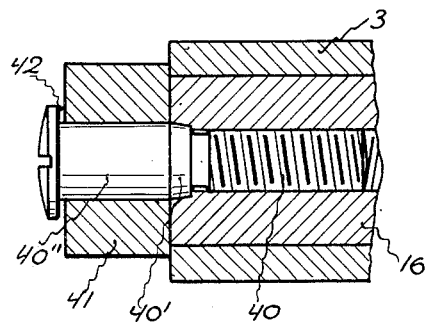
Figs. 13 and 14 are drawn to a larger scale and show the guiding means of the machine seen in longitudinal section and in end view, respectively.

The tapering portion 40' of the screw serves for a minute centering of the bearing pin 40", so that said pin cannot take an inclined position due to the threads, and for facilitating this a reduced portion is at hand between the portions 40 and 40', as shown in Fig. 13. At two opposite sides the block 41 is provided with guide faces 41' (Fig. 14) adapted to be in contact with the edges of radial slot 43 in the cover disc 6, as indicated in Figs. 11 and 12.

In the construction just described, the transverse wall 16 will not be subjected to any wear, and consequently it may be produced from some light metal, but both the pin 40" and the block 41 ought to be produced from a hard material such as tempered steel. The transverse wall 16 shall naturally be of so great a thickness counted in circumferential direction that the slot 43 during the working of the machine cannot be tilted into such a position that a free opening is formed to the cylinder chambers through the cover disc.

Figure 15:
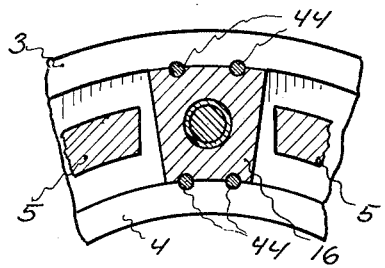
Figs. 15 and 16 show two different embodiments of the radial transverse wall seen in cross section.

On account of the different distances of the cylinder walls 3 and 4 from the centre of the machine, and due to the differences in temperature arising at the two cylinder walls when the machine is running, it will oftenly be found rather difficult to provide for a reliable tightening between the inlet and outlet sides of the machine at the transverse wall. In order to eliminate the disadvantages arising herefrom it is possible to employ the affixing means for the wall indicated in Fig. 15. In this case the transverse wall 16 (whether it is additionally affixed by means of a screw 39 according to Figs. 11, 12, or not) is fixedly wedged into its place by means of a number of pins 44 produced from a metal having a greater coefficient of expansion than the material in the walls 3, 4 and 16. These pins 44 are partially countersunk both in the transverse wall 16 and in the cylinder walls 3, 4. When a leakage tends to occur between the contact faces due to non-uniform expansion, the pins 44 will expand to a greater extent than the surrounding parts of construction, and thereby they will form a packing means between the latter. Naturally it may be sufficient to employ only one of these pins at each of the contacting surfaces, especially if pins of a relatively large diameter can be used, but for the sake of reliability it is preferable to employ two pins at each contact surface, as shown in the drawings.

Figure 16:
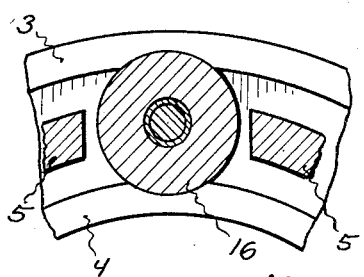

Fig. 16 indicates another manner in which the same result may be effected. In this instance the whole transverse wall 16 is assumed to consist of a metal having a greater coefficient of expansion than the surrounding parts of construction, and this transverse wall is preferably countersunk in the cylinder walls 3, 4 substantially in the same manner as shown in Figs. 1 and 2. The transverse wall need not be rotatably mounted, however, and it may be affixed by means of a screw substantially in the same manner as described above, but nevertheless it may be given a cylindrical shape for the purpose of facilitating the mechanical construction.

The guiding means shown in the embodiments according to Figs. 17-20, and adapted for guiding the piston 5 by the intermediary of the cover disc 6, are mainly intended to be used in comparatively small machines, and therefore they are of a very simplified form.

Figure 17:
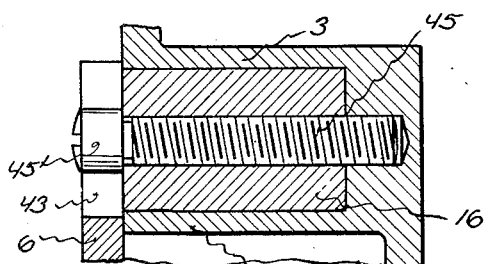
Figs. 17 and 18 show another embodiment thereof seen in longitudinal section and in end view, respectively.
Figure 18:
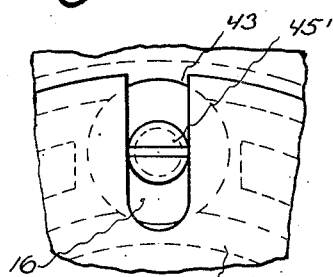
Figure 19:
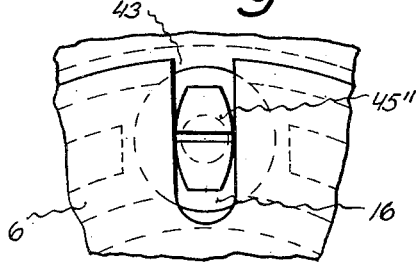
Fig. 19 shows a modification of the guiding means seen in end view.

According to the embodiment shown in Figs. 17 and 18, the transverse wall 16 is affixed in its place by means of a screw 45 provided with a head 45' adapted to extend into the slot 43 in the cover disc 6, and this head may either be circular as shown in Figs. 17 and 18, or oval as shown at 45" in Fig. 19. In this instance the transverse wall 16 is cylindrical according to Fig. 16, but it is evident that the wall may also be constructed according to Fig. 15.

Figure 14:
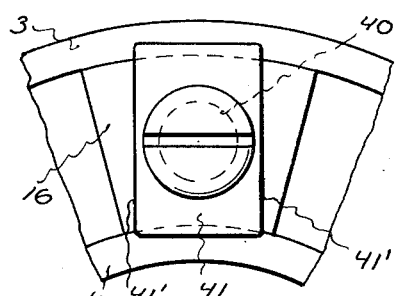
Figure 20:
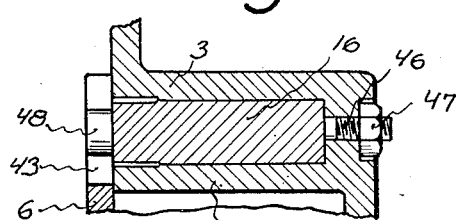
Fig. 20 shows another modification thereof seen in longitudinal section through the transverse wall.

Finally, in respect of the embodiment shown in Fig. 20, the transverse wall is carried out in one piece with a screw 46 provided with a nut 47 for the purpose of affixing the transverse wall in its place. At its opposite end the said transverse wall is provided with a pin 48 carried out in one piece with the same and adapted to slide in the slot 43 in the cover disc 6. The said pin 48 might also be provided with a slide block 41 substantially in the same manner as shown in Figs. 13 and 14. Instead of carrying out the screw 46 in one piece with the transverse wall 16, a similar affixing means may naturally also be provided by means of a screw seated in a threaded bore in the transverse wall substantially in the same manner as shown in Fig. 11. In case the transverse wall 16 is rotatably mounted in the manner shown in Fig. 2, the guiding means for the piston may simply consist of a fixed lug provided on the transverse wall and having substantially the same shape as the block 41, such lug being slidably mounted in the slot in the cover disc.

What I claim and desire to secure by Letters Patent is:—

1. In a rotary pump, or compressor, an annular cylinder confined in radial direction by two coaxial cylider walls and at its one end by a fixed wall, an annular piston member mounted eccentrically movable within said cylinder in contact with its walls, a cover disc connected with said annular piston member and adapted slidingly to contact with and to close the opposite cylinder end, a radial transverse wall mounted in the cylinder, said transverse wall being originally carried out as a separate piece of construction and inserted between the coaxial cylinder walls, a number of tightening pins positioned at the contact faces between the transverse wall and the coaxial cylinder walls, such pins being produced from a material having a greater coefficient of expansion than the adjacent parts of construction, an axial slot in the piston at the point of location of the radial transverse wall, a rotatable driving means positioned centrally in relation to the annular cylinder, a crank means connected with said driving means and adapted for driving the piston member by the intermediary of the cover disc, means for mounting the cover disc and the piston member connected therewith slidingly in axial direction in relation to the cylinder, and coacting guiding means provided in connection with the transverse wall and the cover disc and adapted for guiding of the piston connected with the latter.

2. In a rotary pump or compressor, an annular cylinder confined in radial direction by two coaxial cylinder walls and at its one end by a fixed wall, an annular piston member mounted eccentrically movable within said cylinder in contact with its walls, a cover disc connected with said annular piston member and adapted slidingly to contact with and to close the opposite cylinder end, a radial transverse wall mounted in the cylinder, a split portion upon the piston member straddling said wall, a rotatable driving means positioned centrally in relation to the annular cylinder, a crank means connected with said driving means and adapted for driving the piston member by the intermediary of the cover disc, means for mounting the combined piston aggregate freely slidingly in axial direction in relation to the cylinder end, means for mounting of the said aggregate freely slidingly also in radial direction independently of the axial sliding movement, and slot-and-pin guide means provided directly between the transverse wall within the cylinder and the cover disc and adapted to concentrate the guiding forces applied to the piston aggregate substantially in the plane of contact between the cover disc and the cylinder end.

3. In a rotary pump or compressor, according to claim 2, the additional feature that the transverse wall within the cylinder is provided at its end with the pin means contacting slidingly with two parallel guide faces positioned radially on the cover disc at opposite sides of said pin member.

4. In a rotary pump or compressor according to claim 2, the additional feature that the transverse wall within the cylinder is provided at its end with the pin member straddled by a radial slot through the cover disc.

5. In a rotary pump or compressor according to claim 2, the additional feature that the slot-and-pin guide means for the piston aggregate comprises a guide block or head, rotatably mounted on a pivot member affixed to the radial transverse wall within the cylinder and extending beyond the end thereof facing the cover disc, such guide block or head, being adapted slidingly to contact with two parallel and radially positioned guide faces on the cover disc located at opposite sides of said block or head.

In testimony whereof I have signed my name to this specification.

JOHN EKELÖF.